United States Patent [19]

Cornelius

[11] 4,195,966
[45] Apr. 1, 1980

[54] PITCH CONTROL SYSTEM FOR HELICOPTER ROTOR BLADES

[76] Inventor: George W. Cornelius, P.O. Box 5099, Eureka, Calif. 95501

[21] Appl. No.: 921,255

[22] Filed: Jul. 3, 1978

[51] Int. Cl.² .............................................. B64C 27/72
[52] U.S. Cl. ...................................... 416/18; 416/31; 416/51
[58] Field of Search ...................... 416/18, 114, 31, 51, 416/131 A, 138 A, 139 R, 36; 244/17.13

[56] References Cited

U.S. PATENT DOCUMENTS

| | | | |
|---|---|---|---|
| 2,519,762 | 8/1950 | Hoffmann et al. | 416/18 |
| 2,614,637 | 10/1952 | Landgraf | 416/139 R X |
| 2,646,848 | 7/1953 | Young | 416/18 |
| 2,757,745 | 8/1956 | Verhage et al. | 416/114 X |
| 2,971,584 | 2/1961 | Schön | 416/18 X |
| 3,308,888 | 3/1967 | Arcidiacono | 416/114 |
| 3,649,132 | 3/1972 | Arcidiacono | 416/114 X |
| 4,025,230 | 5/1977 | Kastan | 416/114 X |

FOREIGN PATENT DOCUMENTS

| | | | |
|---|---|---|---|
| 1040906 | 10/1958 | Fed. Rep. of Germany | 416/139 R |
| 1275871 | 8/1968 | Fed. Rep. of Germany | 416/18 |
| 654089 | 6/1951 | United Kingdom | 416/36 |

*Primary Examiner*—Everette A. Powell, Jr.
*Attorney, Agent, or Firm*—Christie, Parker & Hale

[57] ABSTRACT

A system is disclosed for controlling the pitch angle of helicopter rotor blades to compensate for differences in lift generated by advancing and retreating blades during translational flight or due to gust loading of individual blades. Each rotor blade is free to move about its pitch axis to achieve an adjustable balance between a pitching moment exerted by the blade and centrifugal force exerted by weights rotating with the blade system. Collective and cyclic pitch commands from the pilot are transmitted through a conventional swash plate to a linkage which adjusts the relationship of the pitching-moment and centrifugal forces which produces a balanced condition. The system maintains near-constant blade lift as the blade rotates, and minimizes blade distortion and asymmetric coning, thereby significantly reducing vibration arising from a shifting of the center of mass of the rotor-blade system away from the center of rotation.

16 Claims, 8 Drawing Figures

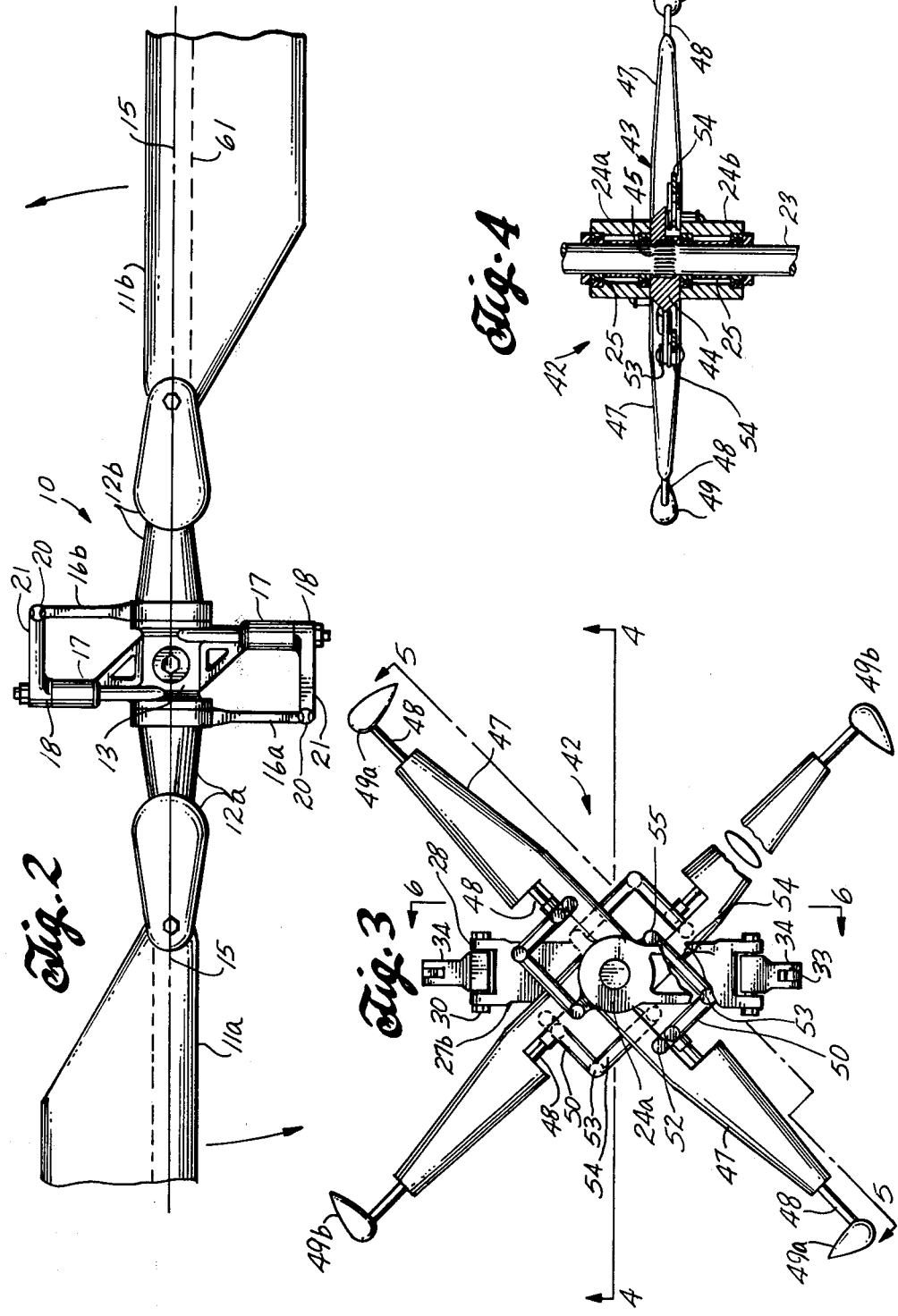

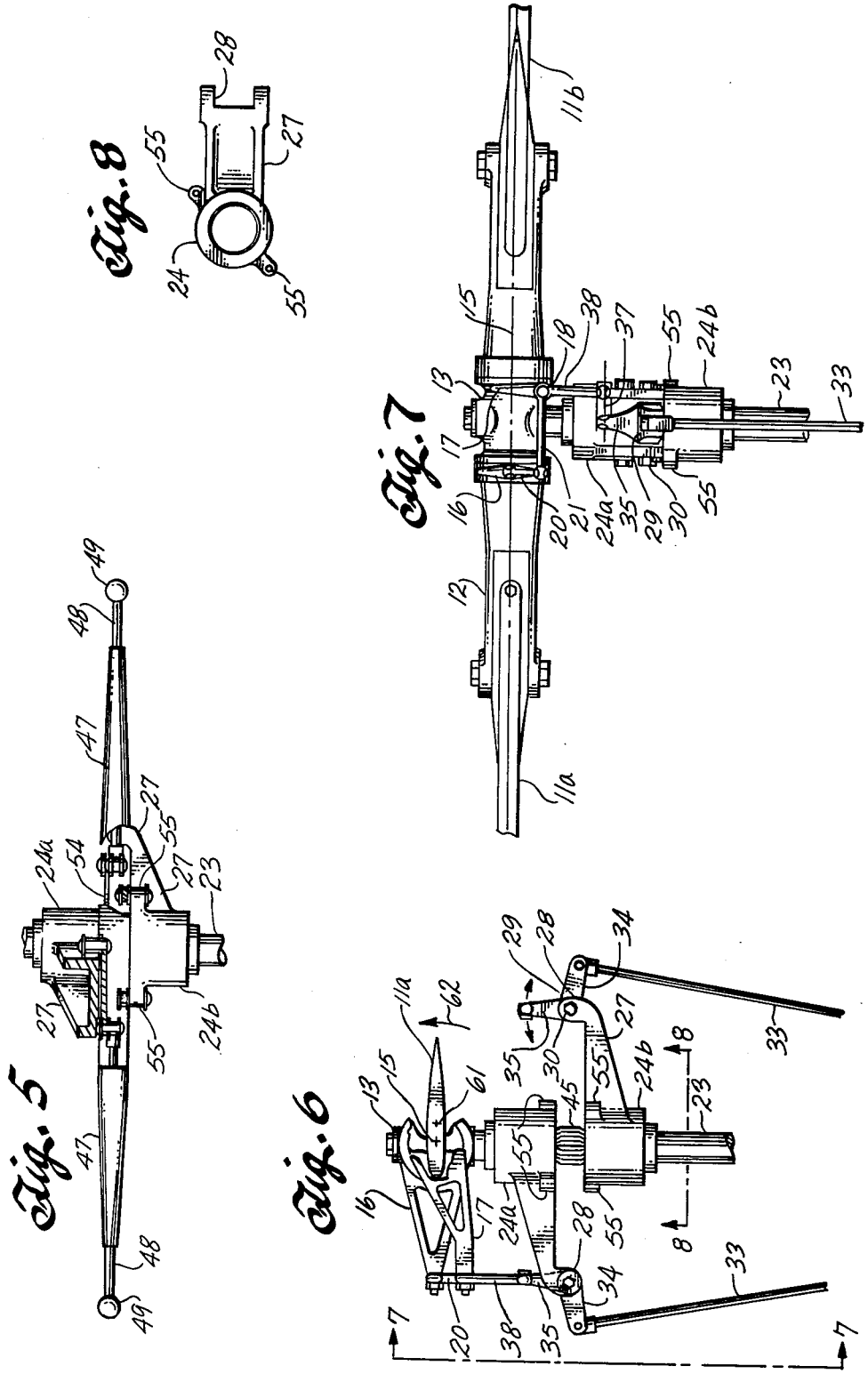

PITCH CONTROL SYSTEM FOR HELICOPTER ROTOR BLADES

BACKGROUND OF THE INVENTION

A helicopter is a rotary-wing aircraft using a system of power-driven rotor blades to generate lift and thrust enabling the craft to climb and to move in a horizontal direction. The pitch or incidence angle of each blade is individually adjustable to vary the angle of attack (the angle between the relative wind passing the blade and the blade chord) and hence the lift generated by the blade. It is conventional to provide the pilot with a collective pitch control (which changes the pitch on all blades simultaneously and equally), and a cyclic pitch control (which constantly varies the pitch of the individual blades through the 360-degree cycle of rotation).

Unlike a fixed-wing aircraft in which control in the roll, pitch and yaw axes is provided by deflection of movable surfaces (ailerons, elevator and rudder), the roll and pitch axes of a helicopter are controlled by the cyclic pitch control which varies the pitch of the rotating blades to tilt the tip-path plane of the rotor system. Tilting of this rotational plane of the rotor system creates a thrust component which tips the craft in the roll or pitch axes. Helicopters conventionally have an engine-driven tail rotor, the generally horizontal thrust of which is controlled by the pilot to compensate for torque of the main rotor system and to provide control about the yaw axis of the craft.

The collective and cyclic pitch controls in a helicopter are typically implemented by a swash-plate assembly positioned below the rotor head where the blades join the engine-driven rotor shaft. The swash plate has a pair of disks with central openings through which the rotor shaft passes. The lower disk does not rotate, and is connected by linkages to pilot-controlled collective and cyclic levers or "sticks" in the cockpit. The upper disk rotates with the rotor system, and is connected to pitch horns which control the pitch angles of the blades (each of which is mounted on the rotor head to be rotatable about the blade pitch axis). The upper and lower disks are coupled by a bearing system which enables the rotating upper disk to follow vertical (collective) and tilting (cyclic) movement of the stationary lower disk as commanded by the pilot.

When a helicopter is hovering, ascending or descending vertically in a no-wind condition, equal lift is generated by each rotor blade throughout the 360-degree rotational cycle, and the craft is in a symmetric condition with blade pitch controlled uniformly by the collective pitch control. In this condition, the velocity of the relative wind over the blades is simply a function of rotor speed, and constant lift is generated by each blade as long as the blade speed and pitch angle are constant. This symmetric constant-lift condition is lost when the craft is moving in a horizontal direction (or even in a stationary hover if the wind is blowing) because the velocity of the relative wind varies as the blade rotates.

This "dissymmetry of lift" condition is most easily visualized by considering a helicopter in forward flight at say 80 mph, with a rotor tip speed (controlled by rotor shaft rpm) of say 350 mph, and the blades rotating conventionally in a counterclockwise direction when viewed from above. When a given blade is at a three-o'clock position to the pilot's right, the relative wind at the blade tip is 350 mph plus 80 mph or 430 mph. When the blade rotates to the nine-o'clock position to the pilot's left, the relative wind at the tip is now the difference between the tip speed and the forward speed, or 270 mph. This difference in relative wind over the advancing and retreating blades produces a dissymmetry of lift which, unless compensated, would roll the craft violently out of control.

Compensation for non-uniform lift developed in normal flight is partially provided by the cyclic pitch control which enables the pitch angle of the advancing blade to be reduced, while the pitch angle of the retreating blade is increased. Another important source of compensation arises from blade flapping which is a structural bending of the relatively limber blade along its length. Some helicopters are equipped with flapping or teetering hinges (positioned where the blades join the central rotor shaft) to enable further freedom of motion in this mode.

Blade "coning" or uniform upward flapping or bending movement occurs even in a symmetric lift condition as a result of the lifting forces which increase along the length of the blade as the tip is approached. In a dissymmetry-of-lift condition, the advancing blade flaps or bends upwardly to decrease the angle of attack of the blade (by altering the direction of the relative wind), and the retreating blade flaps or bends downwardly (relative to the advancing blade) to increase the blade angle of attack. Lift of the advancing blade is thus diminished, and lift of the retreating blade increased to compensate automatically for the otherwise non-uniform lift generated around the rotor disk.

A problem introduced by the natural differential flapping tendency of rotor blades is a shifting of the center of mass of the rotor system away from the center of rotation (the axis of rotation of the engine-driven rotor shaft) of the system. This dynamic unbalance causes significant vibration which is transmitted through the entire craft. This vibration is a major source of pilot fatigue and ride discomfort in helicopters, and causes accelerated wear and metal fatigue of moving parts, and the need for frequent inspection and expensive maintenance.

It is possible to build a very stiff blade which resists bending in the coning mode, but this does not solve the overall problem because the radially outer part of the blade will twist to effect a change in pitch attitude and hence angle of attack. The outer end of the blade is most susceptible to twist because this end is far removed from the rigid connection of the blade root and hub, and because blade speed increases as the tip is approached. The torsional or twisting movement of the blade tips in attempting to unload or absorb the lift unbalance between advancing and retreating blades produces vibration and structural fatigue just as in a rotor system which is limber and relatively free to bend in the coning mode.

The objective of this invention is to minimize distortion of the individual rotor blades to keep the center of mass of the rotation system substantially coincident with the rotation axis, thereby minimizing this major source of helicopter vibration. In a rotor system using the invention, each blade is free to rotate about its pitch axis, and is only indirectly controlled by swash-plate position. This arrangement differs entirely from conventional blade-pitch controls where the rotating swash-plate disk is directly connected to the blade pitch horns by pivoted linkage arms.

The inventive system balances blade pitching moment (the reaction force of blade lift which tends to rotate the blade around its pitch axis) against a compensating force which is independently generated for each blade. A change in pitching moment may arise from the cyclic dissymmetry of lift occurring during translation flight as described above, and may also occur from gust loads applied unevenly to the individual blades during flight in turbulent air. These changes cause an automatic variation in individual blade pitch in a manner which maintains near-constant lift throughout the rotational movement of the blade, and without causing asymmetric blade flapping which induces dynamic unbalance and vibration.

In a presently preferred form, the compensating force is generated by weights which rotate with the mast. The weights are mounted to be radially movable to generate a variable compensating centrifugal force which is balanced against blade pitching moment. A linkage is connected between the weights, blade pitch horn, and swash plate to provide a variable-moment-arm coupling between the blade and weights, the moment arm being controlled by the pilot commands to the swash plate.

In effect, the coupling linkage is analogous to a seesaw of first-order lever with a movable fulcrum, and with the pitching-moment and compensating forces being applied to opposite ends of the lever in a balanced condition. Pilot commands injected through the swash plate effectively move the fulcrum of the seesaw or lever to cause a balanced condition to exist at a different blade-pitch position. Each individual blade, however, remains free to vary in pitch position about this nominal pilot-commanded position to compensate for dissymmetry of lift arising during blade rotation.

SUMMARY OF THE INVENTION

In broad terms, this invention is directed to a system for controlling pitch attitude of individual blades in a rotorcraft main rotor system. Each blade is mounted to be movable about a pitch axis to vary the blade incidence angle and hence angle of attack. A means is provided to sense lift generated by the blade, and to generate a force, signal, or other output which is related to lift. A compensating means is arranged to generate a force, signal, or other output which is related to rotational speed of the blade and rotor system. The compensating means is symmetrical with respect to the rotor rotation axis to maintain substantial dynamic balance of the rotor system during control-system operation.

A collector means is connected to the lift-sensing means and compensating means to receive and compare the respective outputs, and to permit or effect any change in blade pitch attitude needed to maintain the outputs in a balanced relationship. The relative magnitude or ratio of the two outputs which produces this balance is variable under the command of the pilot, and the system includes a means for injecting these commands into the collector means.

In a presently preferred form, each blade is selected to have a negative pitching moment about the pitch axis for all flight modes, and the pitching-moment force is transmitted by a linkage to be applied as a torque force on a collector ring rotatably mounted on the main drive shaft of the rotor system. A compensating centrifugal force is generated by weights radially spaced from the drive shaft and rotating with the blades. The compensating force is transmitted through a linkage to be applied to the collector ring as a torque force which opposes the pitching-moment torque on the ring.

One of the linkages includes a means for varying the moment arm over which one of the forces is applied to the ring, and this enables a torque balance to be achieved for variable ratios of the two forces. Preferably, the variable moment arm is controlled by the pilot through a conventional swash plate or equivalent mechanism, but the blade is not "hard coupled" to the swash plate and is instead indirectly controlled in pitch attitude by the swash plate. The blade is thus free to seek a pitch attitude which will maintain the torque balance without pilot command or swash-plate movement, and which produces substantially constant lift for all blade azimuth positions and during transient loads as encountered when flying in gusty air conditions.

BRIEF DESCRIPTION OF THE DRAWINGS

FIG. 2 is a top view of the rotor head and blade assembly only;

FIG. 3 is a top view of a weight and linkage assembly positioned below and rotating coaxially with the rotor head and blades;

FIG. 4 is a first elevation of the weight assembly on line 4—4 of FIG. 3;

FIG. 5 is a second elevation of the weight assembly on line 5—5 of FIG. 3.

FIG. 6 is an elevation on line 6—6 of FIG. 3 showing a portion of the rotor head and a portion of the weight assembly (the weights and portions of the linkages being deleted for clarity);

FIG. 7 is an elevation on line 7—7 of FIG. 6; and

FIG. 8 is a bottom view of a torque collector ring on line 8—8 of FIG. 6.

DESCRIPTION OF THE PREFERRED EMBODIMENT

Figure 1:
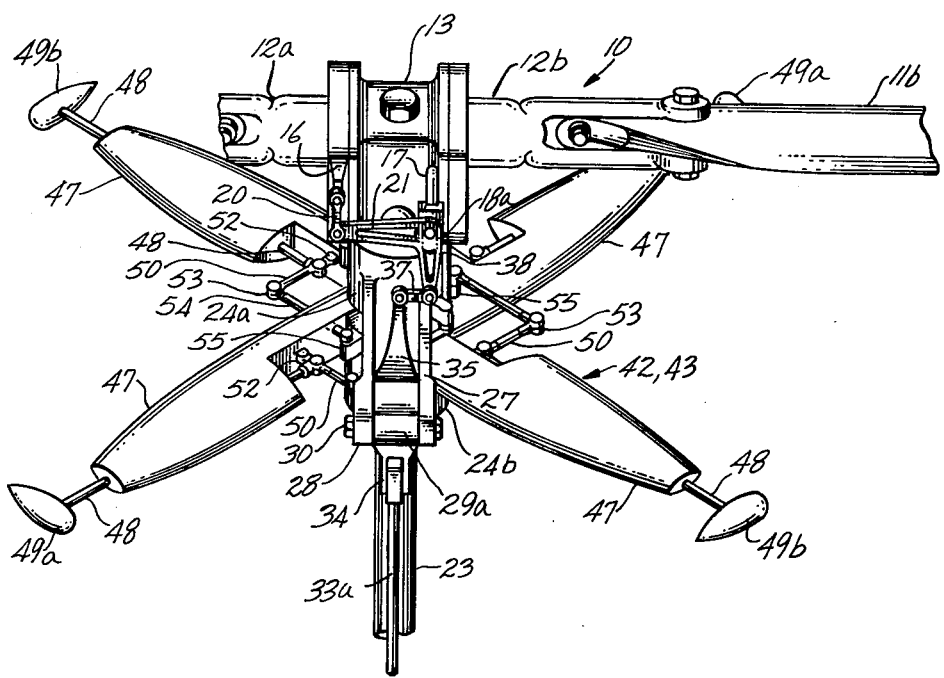
FIG. 1 is a pictorial view of a helicopter rotor shaft, head, and blade assembly incorporating the invention.
Figure 1:
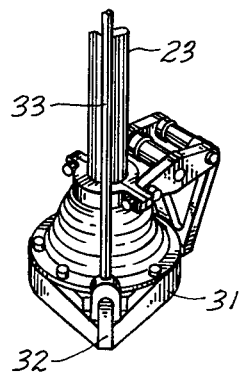

As already described in general terms, this invention relates to a helicopter blade-pitch control system which can be implemented in a number of different ways. The invention is most easily explained in terms of a purely mechanical system which is readily adapted for use on commercially available helicopters, and which in many cases involves changing only portions of the components positioned above the conventional swash plate.

The drawings are accordingly confined to this portion of the helicopter, it being understood that the remaining portions of the craft are conventional. The invention is also described in terms of a two-bladed rotor assembly, but is equally useful with a single blade (with appropriate counterweight) or with rotor assemblies using three or more blades. The invention is not limited to conventional engine-driven rotor assemblies, and is equally useful with blade-tip jets or other styles of rotor-drive systems.

Referring to FIGS. 1, 2, 6 and 7, a helicopter rotor assembly 10 includes a pair of blades 11a and 11b rigidly secured to hub grips 12a and 12b which are in turn rotatably mounted on a central hub 13. A separate pitch-control system is provided for each blade, but the systems are substantially identical. Most of the following discussion will accordingly be directed to blade 11a, and an "a" suffix is used in some of the figures to designate components associated with this blade. A "b" suffix will designate components associated with blade 11b where needed for a full description of the various subassemblies.

the axis about which the blades are rotatable in pitch with respect to the hub is shown in FIGS. 2, 6 and 7 as pitch axis 15. Blade movement about the pitch axis changes the blade pitch or incidence angle which is the angle between the blade chord (a straight line connecting the leading and trailing edges of the airfoil section) and the rotor plane of rotation. A change in pitch angle varies the angle of attack of the blade and accordingly the lift generated by the blade.

A lever or pitch horn 16 extends radially from each hub grip to be rotatable with the hub grip and blade. A stationary support arm 17 extends radially from hub 13 adjacent pitch horn 16, and a bell crank 18 is pivotably mounted at the end of the support arm. A link 20 is connected by ball-socket joints at its opposite ends of the outer end of the pitch horn, and to the end of a generally horizontal arm 21 of the bell crank 18.

Blades 11 are rotated by a generally vertical engine-driven rotor mast or drive shaft 23 which is rigidly secured to hub 13. A pair of vertically spaced-apart torque-collector rings 24a and 24b are mounted on the drive shaft by bearing assemblies 25 to be independently rotatable with respect to the drive shaft. Each collector ring has a rigid arm 27 extending radially therefrom, and each arm terminates in a forked end 28. A bell crank 29 is pivotally mounted by a pin 30 at the forked end of each arm 27. The axis of pin 30 should be reasonably parallel to the axis of the associated blade to minimize feedback of forces into the pilot's controls.

A conventional swash plate assembly is mounted on the drive shaft below the torque-collector rings, and only an upper disk 31 (which is splined to and rotatable with the drive shaft) of this assembly is shown in FIG. 6. As previously explained, the swash plate upper disk is moved axially (vertically) along the drive shaft by the pilot's collective pitch control (not shown), and is tilted (with respect to a plane normal to the axis of the drive shaft) by the pilot's cyclic pitch control (not shown). A pair of rigid arms 32 (one of which is shown in FIG. 1) extend radially from opposite sides of the upper disk.

a pitch link or drive rod 22 is connected by ball-socket jointes at its opposite ends between each swash plate upper-disk arm 32 and an associated generally horizontal arm 34 of each bell crank 29. A generally vertical arm 35 of each bell crank 29 is connected by a ball-socket joint to one end of a generally horizontal coupling link 37, and the opposite end of the coupling link is connected by a ball-socket joint to a downwardly extending arm 38 of bell crank 18.

An important feature of the invention becomes clear at this point in that the swash plate is seen to be operative only to vary the radial spacing of the upper end of bell crank arm 35 from the axis of rotation of associated collector ring 24 and the rotor drive shaft. As explained in greater detail below, this variation in radial spacing controls the moment arm of a torque applied to the collector ring by a pitching moment exerted by the associated blade when the rotor assembly is rotating to generate lift. This arrangement is quite unlike a conventional pitch-control system in which the swash plate upper disk is directly connected to the blade pitch horns to force a change in blade pitch in direct response to collective or cyclic commands from the pilot.

Referring to FIGS. 3-5, a compensating-force-generating assembly 42 includes a frame 43 which is sandwiched between vertically spaced collector rings 24a and 24b. A central hub 44 of the frame is rigidly secured to drive shaft 23 by a splined connection 45. The frame is thus axially and rotationally fixed to the drive shaft, and rotates therewith at rotor speed. Collector rings 24a and 24b, on the other hand, are axially fixed but rotationally free on the shaft.

Frame 43 has four spaced-apart aerodynamically faired shells or legs 47 extending radially therefrom, and a weight-supporting shaft 48 is journaled through each leg to extend radially beyond the leg end. A teardrop-shaped weight 49 is rigidly secured at the outer end of each shaft 48, and the inner end of each shaft is pivotally connected to a lever arm 50 at a point between the ends of the lever arm. One end 52 of the lever arm is pivotally mounted on the associated frame leg and an opposite end 53 is pivotally connected to an outer end of a torque link 54. The inner end of the torque link is pivotally connected to a torque lug 55 which extends integrally and radially from associated collector ring 24 (FIGS. 1, 3 and 8).

As best seen in FIG. 3, each rotor blade is thus associated with a pair of weights 49 which are spaced 180 degrees apart, and the weights are connected by shafts 48, lever arms 50, and torque links 54 to similarly spaced torque lugs 55 on associated collector ring 24. A two-blade rotor system accordingly has two sets of weights and connecting linkages spaced around the rotor drive shaft. It should be noted that the individual weights in each coupled pair of weights are equidistant from the axis of rotation of the rotor drive shaft, but that the radial spacing of each pair of weights is variable. Any change in this radial spacing will be accompanied by movement of lever arms 50 and torque links 54, and by a rotational movement of associated collector ring 24 with respect to the drive shaft.

Pitch axis 15 and the airfoil section of each rotor blade are selected so a center of pressure on the blade is always rearward of the pitch axis. The center of pressure is that chordwise point at which the aerodynamic loads on the airfoil section may be considered as concentrated. The locus of these points along the span of each blade is approximated by axis 61 in FIG. 2, but it is recognized that this axis will migrate chordwise (but always aft of the pitch axis) as the angle of attack of the blade is varied and as flight conditions are changed. The blade is preferably of a rigid, stiff construction, and care is taken in blade balancing to keep the airfoil-section center of gravity on the blade pitch axis.

The chordwise spacing of the center of pressure behind the pitch axis results in a negative pitching moment on the blade. This is, the forces acting at the center of pressure are applied on a moment arm resulting in a torque which tends to reduce the pitch angle of the blade as suggested by arrow 62 in FIG. 6. The blade pitching moment is directly related to lift generated by the rotating blade, and the pitching moment is transmitted through pitch horn 16, link 20, bell crank 18, and link 37 to result in a counterclockwise (viewed from about) torque on collector ring 24.

Spinning weights 49, on the other hand, result in the application of a clockwise torque to each collector ring 24. This torque arises from the centrifugal force of each weight which is applied through associated shaft 48, lever arm 50, and torque link 54 to torque lug 55 on the collector ring. The magnitude of the centrifugal force is directly related to the square of the velocity of the weight, and inversely related to the radial spacing of the weight from the center of rotation. When rotor rpm is constant, a constant clockwise torque is accordingly applied to the collector ring so long as the associated pair of weights remain at a constant radial spacing from the shaft.

Assume that one of the blades is generating decreasing lift because the blade is retreating with respect to the direction of helicopter flight. The negative pitching moment of the retreating blade is accordingly reduced, as is the counterclockwise torque applied to the collector ring. The compensating force applied to the collector ring by the spinning weights then overbalances the pitching-moment torque, causing a clockwise rotatonal movement of the collector ring.

This movement, however, is transmitted through the blade pitch horn and associated linkage to increase the pitch angle of the blade. The angle of attack and lift of the blade are accordingly increased, and the corresponding increase in negative pitching moment re-establishes the torque balance between the forces applied to the collector ring. An opposite reaction will occur on the advancing blade, an the net effect is for the rotating blades to generate substantially constant lift throughout each rotational cycle.

The same automatic corrective action occurs if a blade is subjected to gust loads which tend to change the blade angle of attack and hence the lift generated by the blade. It should be noted that the system also drives the blades to the proper pitch attitude for autorotation should an engine failure occur. Unlike conventional pitch control systems, each blade is free to seek a pitch angle which produces a pitching moment sufficient to balance the opposing compensating force applied to the collector ring by the weights.

Although this system functions automatically to maintain substantially constant lift at all blade positions around the rotor "disk", the pilot continues to have full command of nominal collective and cyclic pitch as necessary to control the attitude and direction of flight of the craft. These pilot commands are injected in the control system by moving the swashplate which in turn moves bell crank 29 to adjust the moment arm on which the pitching force of the blade is applied to the collector ring.

As previously mentioned, this mode of collective and cyclic pitch control can be visualized as moving the fulcrum of a seesaw or teetertotter which has the pitching-moment and compensating forces applied to its opposite ends. A command to increase collective pitch, for example, will move the upper end of bell crank 29 toward the axis of rotation of the rotor shaft, tending to decrease the pitching-moment torque applied to the collector ring.

The resulting torque unbalance causes the collector ring to rotate with respect to the rotor shaft in a direction which increases blade pitch angle which is the desired result. The pilot is in effect moving the fulcrum of the seesaw to create a torque unbalance which results in a pitch-angle change sufficient to alter the blade pitching moment to re-establish a new balance between the pitching moment and the compensating centrifugal force of the weights.

In the system described above, the movement of the seesaw fulcrum is effected by varying the radial spacing of the pitching-force linkage from the axis of the rotor shaft. This arrangement is preferred because it minimizes the variation in radial spacing of the centrifugal-force weights from the rotor-shaft axis, and this goal is further approached by the motion amplification provided by lever arms 50 which couple the weights to the torque-collector ring. It is to be understood, however, that this moment-arm variation could be incorporated in the linkage which transmits the centrifugal force of the weights to the collector ring.

Similarly, the invention can be practiced with other styles of control systems which may use electrical or hydraulic components in place of the mechanical system just described. For example, an electrical signal which is related to rotor rpm can be derived from a tachometer generator on the rotor shaft or from a strain-gage transducer which senses the minute elongation of the blade with increasing rpm. Blade pitching moment can also be sensed with strain gages or other types of electrical transducers.

The two resulting signals are then combined in a circuit which generates an output (responsive to unbalance of the signals) which drives a blade-pitch positioning mechanism in a direction which restores balance of the input signals. The relative magnitude of the two input signals needed to achieve balance is adjusted by the pilot by injecting collective-and cyclic-pitch signals from the cockpit into the circuit. This system philosophy can also be implemented with hydraulic or pneumatic components, or by hybrid systems using several different types of sensors, signal-combining means, and output controllers.

The mechanical system described above is presently preferred because it is simple and readily adapted for retrofit in existing conventional rotorcraft. This system also uses essentially standard linkage components which are easily serviced and maintained by personnel familiar with conventional blade control systems.

A variety of design options are also available in the context of the purely mechanical system. For example, it is not essential that the weights be axially spaced on the rotor shaft from the blades, and these weights could be housed within the blade roots in a fully enclosed configuration. Alternatively, the weights can be positioned above the blades if this geometry is more compatible with the overall design of the rotor system.

There has been described a rotorcraft blade-pitch control system which achieves near-constant blade lift throughout the blade rotational cycle or during gust loads, and which provides a significant reduction in vibration, power requirements, and torque loads which must be balanced by the tail rotor or equivalent torque-compensating system. Achievement of these goals provides an important increase in pilot comfort due to decreased noise and airframe vibration, and reduces maintenance expense and time by preventing a substantial part of the vibratory forces which characterize conventional rotorcraft and cause metal fatigue and the need for frequent and costly servicing of airframe and rotor-system components. These goals are realized without requiring pilot re-training or revision in flying techniques, and the system is adaptable to both old and new commercial helicopter designs.

I claim:

1. In a rotorcraft having a rotor system with a blade which is mounted to be movable in pitch attitude, a pitch control system for the blade comprising:

lift-sensing means for sensing the lift generated by the blade, and for providing a first output related to lift;

compensating means for generating a second output related to rotational speed of the rotor system, the compensating means being symmetrical with respect to an axis of rotation of the rotor system whereby dynamic balance of the rotor system is substantially maintained during operation of the control system;

collector means connected to the lifting-sensing means and compensating means for comparing the first and second outputs, and for adjustably balancing the outputs by changing the pitch attitude of the blade; and pilot-controlled means connected to the collector means for varying the relationship of the first and second outputs which results in a balanced condition of the outputs.

2. The system defined in claim 1 wherein the blade is freely movable in pitch attitude independently of the pilot-controlled means to maintain the first output in balance with the second output.

3. The system defined in claim 2 wherein the first output is a force proportional to blade pitching moment, the second output is a force proportional to centrifugal force exerted by the blade during rotation, and the collector means couples the forces in opposed relationship to drive the blade to a pitch attitude which maintains the first output in the adjustably balanced condition with the second output, the collector means being arranged to prevent any substantial transmission of the first and second output forces to the pilot-controlled means.

4. The system defined in claim 3 wherein the collector means is arranged to vary the effective magnitude of one of the first and second outputs in response to commands from the pilot-controlled means to effect a change in the magnitude of the blade pitching moment which maintains the balanced condition.

5. In a rotorcraft having a rotor system with a blade which is mounted on a rotor shaft to be movable in pitch attitude about a pitch axis, the blade being arranged to generate lift which produces a negative pitching moment tending to move the blade toward a decreased pitch attitude, a pitch control system comprising:

a first means connected to the blade to sense the blade pitching moment about the pitch axis, and to provide a first output proportional to pitching moment;

a second means on the rotor system for sensing rotational speed of the blade and rotor shaft, and to provide a second output related to rotational speed, the second means being arranged with respect to an axis of rotation of the rotor system whereby dynamic balance of the rotor system is substantially maintained during operation of the control system;

a third means connected to the first and second means to receive and compare the first and second outputs, the third means being operative to couple these outputs in opposing relationship so blade pitch attitude is varied to maintain the outputs in a balanced condition, the third means being arranged to receive pilot commands to vary the ratio of the outputs which produces this balanced condition; and pilot-controlled means connected to the third means to vary said ratio, whereby the pilot is provided with collective and cyclic pitch control of the blade, and the blade is free to seek pitch attitudes which maintain the balanced condition as the blade rotates and without requiring adjustment of the pilot-controlled means.

6. The system defined in claim 5 wherein the first means comprises a pitch horn connected to the blade and extending therefrom generally perpendicularly to the pitch axis, and a linkage connected between the pitch horn and the third means.

7. The system defined in claim 5 wherein the second means comprises a weight mounted on the rotor system to be rotated with the blade and to be radially movable with respect to the axis of rotation of the rotor system, and a linkage connected between the weight and third means, the second output being centrifugal force exerted by the weight.

8. The system defined in claim 7 wherein the linkage connecting the weight and third means includes a motion-amplifying means for amplifying radial motion of the weight.

9. The system defined in claim 5 wherein the second means comprises a pair of weights mounted on the rotor system to be rotatable with the blade, the weights being positioned on opposite sides of the rotor shaft axis of rotation and being mounted to be movable in radial spacing from said axis, each weight having a linkage connected thereto and to the third means for transmitting centrifugal force exerted by the weight to the third means.

10. The system defined in claim 9 wherein each weight linkage includes a lever arranged to receive radial motion of the weight, and to amplify such motion as applied to the third means.

11. The system defined in claim 5 wherein the third means is a force collector assembly mounted on the rotor system, and wherein the first and second outputs are applied as opposing mechanical forces to the collector assembly.

12. The system defined in claim 11 wherein the force collector assembly includes a member connected to receive one of the first and second outputs, the member further being connected to the pilot controlled means to vary the effective force applied to the force collector assembly from said one output in response to pilot commands.

13. The system defined in claim 12 wherein the first and second outputs are applied as opposing torques to the force collector assembly, and the member comprises a crank having a first end which is radially movable with respect to an axis of rotation of the collector assembly, the first end being connected to receive said one output, the crank having a second end connected to and being movable by the pilot controlled means to vary the moment arm over which said one output is applied to the collector assembly.

14. The system defined in claim 13 wherein said one output is the first output.

15. In a rotorcraft having a rotor system with a lift-producing blade secured to a hub of a power-driven rotor shaft, the blade being movable in pitch attitude about a pitch axis, a pitch control system comprising:

a first linkage mounted on the rotor-shaft hub and connected to the blade to be movable therewith as the blade moves in pitch attitude, the first linkage having an output end to transmit blade pitching-moment force, the output end being radially spaced from the rotor shaft axis of rotation;

a pair of weights mounted on the rotor system to be rotatable with the blade, the weights being positioned on opposite sides of the rotor shaft axis of rotation and being mounted to be simultaneously and equally movable in radial spacing from said axis, each weight including a second linkage with an output end for transmitting centrifugal force exerted by the weight, the output ends of the second linkages being radially spaced from the rotor shaft axis of rotation;

a force collector assembly rotatably mounted on the rotor shaft, the output ends of the second linkages being connected to the collector assembly so the centrifugal forces of the weights are applied as additive torques to the collector assembly, and radial movement of the weights causes the collector assembly to rotate with respect to the rotor shaft; the collector assembly including a member connected to the output end of the first linkage, the member being movable to vary the radial spacing of the first-linkage output end from the rotor shaft axis of rotation whereby the blade pitching-moment force is applied as a variable-moment-air torque to the collector assembly to oppose the additive torques of the weights; and a third linkage connected between said member and pilot-actuated collective and cyclic pitch controls in the rotorcraft, the actuation of said controls being effective to drive the third linkage to move the member and vary the moment arm over which the blade pitching-moment force is applied to the collector assembly.

16. In a rotorcraft having a rotor system with a plurality of lift producing blades secured to and symmetrically arranged around a hub of a power-driven rotor shaft, each blade being movable in pitch attitude about an associated pitch axis, a pitch control system comprising:

a separate mechanism associated with each blade, each such mechanism including:

(a) a first linkage mounted on the rotor-shaft hub and connected to the blade to be movable therewith as the blade moves in pitch attitude, the first linkage having an output end to transmit blade pitching-moment force, the output end being radially spaced from the rotor shaft axis of rotation;

(b) a pair of weights mounted on the rotor system to be rotatable with the blade, the weights being positioned on opposite sides of the rotor shaft axis of rotation and being mounted to be simultaneously and equally movable in radial spacing from said axis, each weight including a second linkage with an output end for transmitting centrifugal force exerted by the weight, the output ends of the second linkages being radially spaced from the rotor shaft axis of rotation;

(c) a force collector assembly rotatably mounted on the rotor shaft, the output ends of the second linkages being connected to the collector assembly so the centrifugal forces of the weights are applied as additive torques to the collector assembly, and radial movement of the weights causes the collector assembly to rotate with respect to the rotor shaft; the collector assembly including a member connected to the output end of the first linkage, the member being movable to vary the radial spacing of the first-linkage output end from the rotor shaft axis of rotation whereby the blade pitching-moment force is applied as a variable-moment-arm torque to the collector assembly to oppose the additive torques of the weights; and third linkages connected between said collector-assembly members and pilot-actuated collective and cyclic pitch controls in the rotorcraft, the actuation of said controls being effective to drive the third linkages to move the members and vary the moment arms over which the blade pitching-moment forces are applied to the collector assemblies.

* * * * *

UNITED STATES PATENT AND TRADEMARK OFFICE
CERTIFICATE OF CORRECTION

PATENT NO. : 4,195,966
DATED : April 1, 1980
INVENTOR(S) : GEORGE W. CORNELIUS

It is certified that error appears in the above-identified patent and that said Letters Patent are hereby corrected as shown below:

```
Column 3, line 25,     "of" should be -- or --.
Column 5, line  3,     "t" should be -- T --;
          line 36,     "6" should be -- 1 --;
          line 43,     "a" should be -- A --;
          line 43,     "22" should be -- 33 --;
          line 44,     "jointes" should be -- joints --;
          line 64,     after "pitch" insert -- angle --.
Column 6, line 59,     "about" should be -- above --.
Column 7, line 21,     "an" should be -- and --.
Column 11, line 18,    "variable-moment-air" should be
                          -- variable-moment-arm --.
```

Signed and Sealed this

Eleventh Day of May 1982

[SEAL]

Attest:

GERALD J. MOSSINGHOFF

*Attesting Officer*  *Commissioner of Patents and Trademarks*